United States Patent
Van Belleghem

(10) Patent No.: US 7,856,919 B2
(45) Date of Patent: Dec. 28, 2010

(54) DEVICE FOR PREPARING INFUSED BEVERAGES

(75) Inventor: Luc Van Belleghem, Corroy-le-Grand (BE)

(73) Assignee: Cense D'Almez S.A., Corroy-le-Grand (BE)

( * ) Notice: Subject to any disclaimer, the term of this patent is extended or adjusted under 35 U.S.C. 154(b) by 0 days.

(21) Appl. No.: 12/089,465

(22) PCT Filed: Oct. 6, 2006

(86) PCT No.: PCT/EP2006/067165

§ 371 (c)(1),
(2), (4) Date: Jun. 3, 2008

(87) PCT Pub. No.: WO2007/042485

PCT Pub. Date: Apr. 19, 2007

(65) Prior Publication Data

US 2008/0250935 A1    Oct. 16, 2008

(30) Foreign Application Priority Data

Oct. 7, 2005    (EP) .................................. 05109368

(51) Int. Cl.
*A47J 31/42*    (2006.01)
*A47J 31/02*    (2006.01)

(52) U.S. Cl. .................. 99/286; 99/289 R; 99/287; 99/288; 99/295; 99/298; 99/280; 99/302 R; 99/307; 99/316; 99/317; 99/318

(58) Field of Classification Search .............. 99/289 R, 99/286–8, 295, 298, 280, 302 R, 307, 316
See application file for complete search history.

(56) References Cited

U.S. PATENT DOCUMENTS

| 3,031,947 | A | 5/1962 | Heuckeroth |
| 3,295,998 | A | 1/1967 | Goros |
| 4,829,889 | A | 5/1989 | Takeuchi et al. |
| 4,983,410 | A | * | 1/1991 | Dinos .......................... 426/77 |
| 5,158,793 | A | 10/1992 | Helbling et al. |
| 5,520,093 | A | 5/1996 | Ackermann et al. |
| 6,117,471 | A | 9/2000 | King et al. |

FOREIGN PATENT DOCUMENTS

DE    3613119 A1    11/1987

(Continued)

*Primary Examiner*—Shawntina Fuqua
(74) *Attorney, Agent, or Firm*—Sughrue Mion, PLLC

(57) ABSTRACT

The invention relates to a device for preparing an infused beverage. The device includes an infusion container for containing liquid and comprising an opening to allow liquid to flow out of the container. The device further includes a receptacle comprising a cavity for receiving a cartridge containing infusible matter. The infusion container and the receptacle are operable in relation to each other to be arranged in a position wherein the infusion container and the cavity communicate through the opening. The device further comprises an openable and closable passage communicating with the cavity to allow liquid to flow from the infusion container to the passage through the cavity. The device further includes a cleaning means for introducing a liquid and/or vapor within the infusion container and a removing means for removing the cartridge from the cavity. An operating means is arranged for operating the cleaning means and the removing means successively.

12 Claims, 14 Drawing Sheets

| | FOREIGN PATENT DOCUMENTS | | | WO | 89/03653 A1 | 5/1989 |
|---|---|---|---|---|---|---|
| | | | | WO | 93/01105 A2 | 1/1993 |
| EP | 625326 A1 | 11/1994 | | WO | 95/01293 A1 | 1/1995 |
| GB | 1 256 247 A | 12/1971 | | WO | 2005/122851 A1 | 12/2005 |
| JP | 2001-120436 | 8/2001 | | * cited by examiner | | |

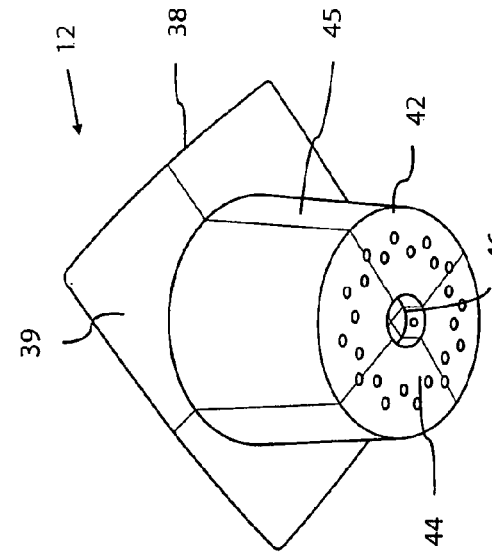
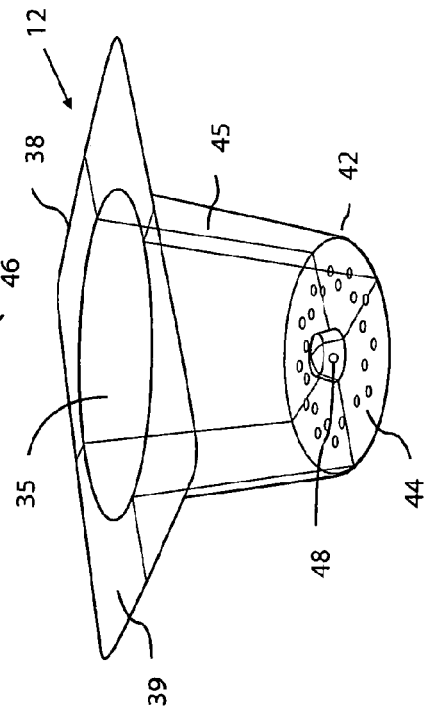
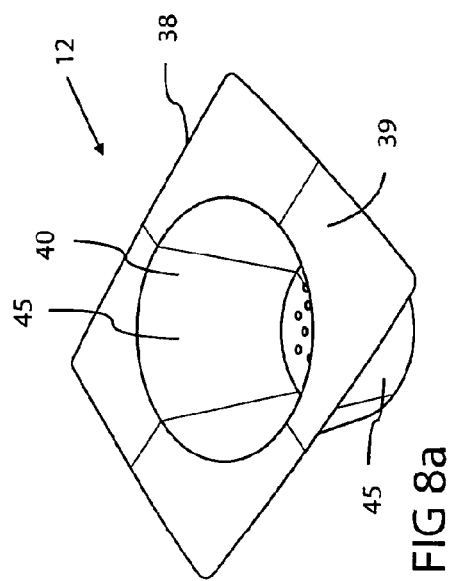
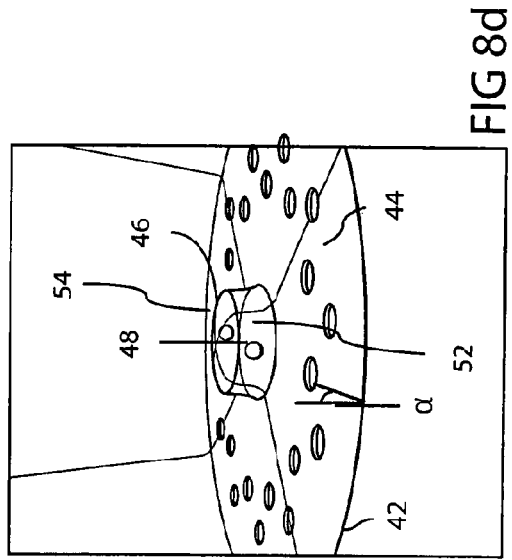

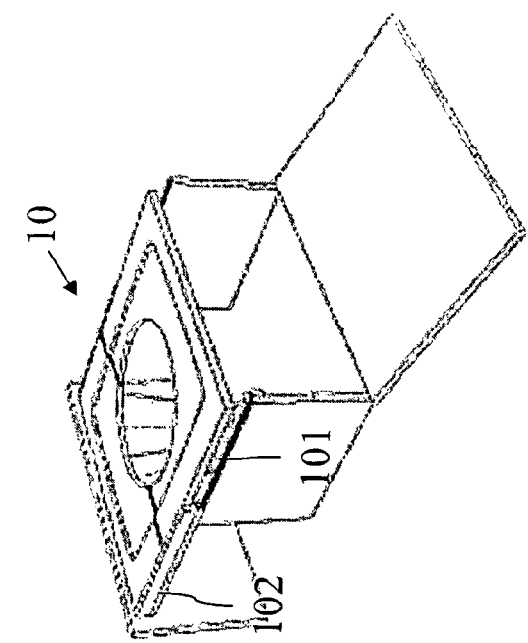
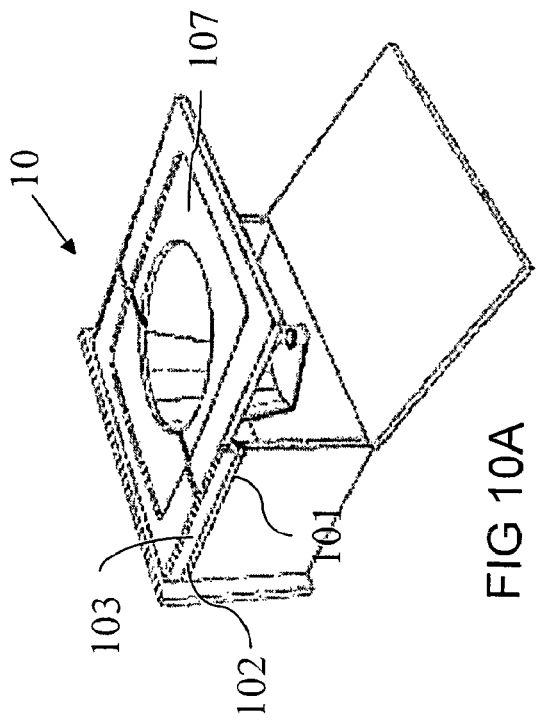
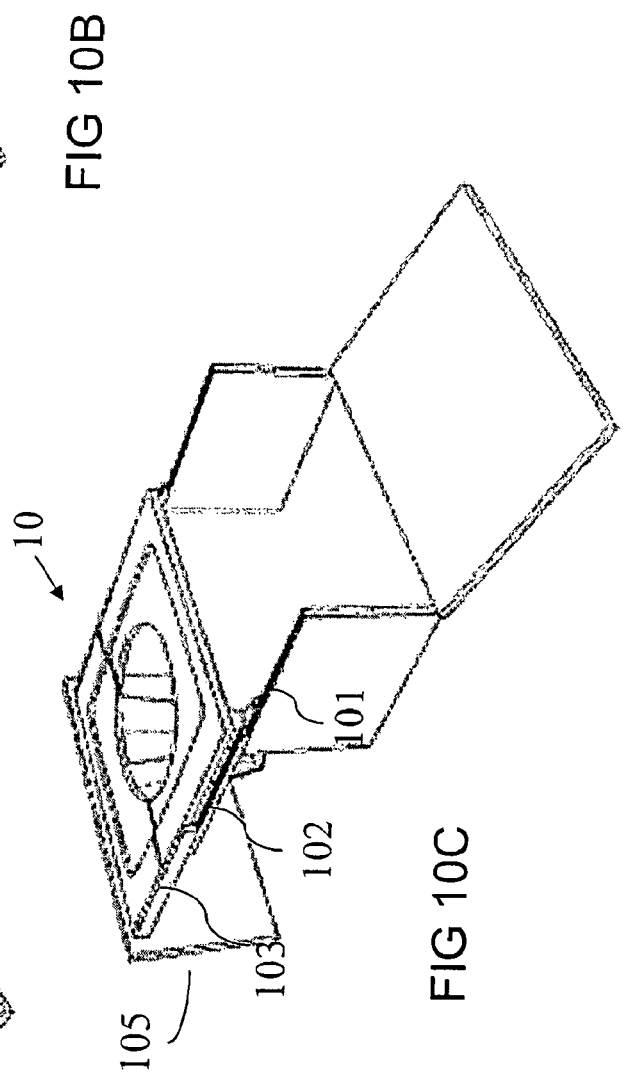
FIG 10A
FIG 10B
FIG 10C

DEVICE FOR PREPARING INFUSED BEVERAGES

CROSS REFERENCE TO RELATED APPLICATIONS

This application is a National Stage of International Application No. PCT/EP2006/067165 filed on Oct. 6, 2006, claiming priority based on European Patent Application No. 05109368.0, filed Oct. 7, 2005, the contents of all of which are incorporated herein by reference in their entirety.

FIELD OF THE INVENTION

The invention relates to a device for preparing infused beverages, more specifically for preparing infused tea.

The device includes an infusion container for containing a liquid and comprising an opening to allow the liquid to flow out of the container. The device further includes a receptacle defining a cavity for receiving a cartridge containing infusible matter. The infusion container and the receptacle are operable in relation to each other to be arranged in a position wherein the infusion container and the cavity communicate through the opening. The device further comprises an openable and closable passage communicating with the cavity to allow liquid to flow from the infusion container to the passage through the cavity.

The invention also relates to a process for preparing an infused beverage in a device including an infusion container for containing liquid and a receptacle comprising a cavity. The infusion container comprises an opening for liquid to flow out. The process includes the steps of inserting a cartridge containing infusible matter in the cavity, the cartridge comprising a liquid-permeable filter. The container and the receptacle are arranged in relation to each other in a position so that the infusion container and the cavity communicate with each other through the opening. Liquid for infusion is introduced in the infusion container so that the liquid flows to the cavity immersing the infusible matter contained in the cartridge. A passage in the device communicating with the cavity is opened to let the infused liquid flowing from the infusion container through the cavity and the filter of the cartridge to the passage.

The invention also relates to a cartridge containing dry infusible matter for preparing an infused beverage. The cartridge comprises a top part, a bottom part and at least one side wall joining the top part and the bottom part. The top part comprises an opening and the bottom part comprises a liquid-permeable filter.

As a matter of example, the infusible matter can alternatively be tea leaves, various different herbs and spices, herbal tea, flower petals, leaves, seeds, roots, powder, coffee or other materials capable of being infused.

DESCRIPTION OF PRIOR ART

Such device and processes are known in the art.

For instance, Japanese patent application JP 2001-120436 discloses a tea preparation device comprising an infusion tank which can be filled with hot water, and a holder which can communicate with the tank through a communication aperture. A passage communicates with the tank for pouring out the infused tea. A cartridge is used and contains tea leaves. The cartridge has a removable top seal.

In use, the tea leaf cartridge is inserted in the holder. The cartridge top seal is automatically removed when the holder is inserted in the device. The opened cartridge in the holder is moved under the tank. Then while the opening is turned toward the interior of the tank, the tea leaves contained in the cartridge are able to move and float freely into the infusion tank, once water is introduced in the tank and holder. The infusion then takes place. A stirring mechanism comprising a rod partially immersed in the infusion tank can be operated to stir the water while infusing.

A drainage hole in the holder and the passage are arranged to discharge the infused tea from the tank to a discharge container and the cartridge is entirely or partially formed as a filter. That is, once the infusion is completed, the tank is emptied and the tea leaves return in the cartridge and settle there.

The disclosed device is easy to use and to prepare infusion in a traditional way during which tea leaves are allowed to float freely in the infused liquid, and it also provides easy handling of the used infusible matter, such as tea leaves, in the cartridge itself forming a filter. However, with the prior art device, residue tends to settle on the inner surface of the infusion container as well as on the rod of the stirring mechanism when infusions are successively carried out. The rod of the stirring mechanism is not easily accessible and cannot easily be cleaned. Residue from preceding infusions tends to alter the quality of the tea, in the sense that both the taste, i.e. the flavour, and the odour, i.e. the perfume, of the tea or infused liquid are progressively corrupted by previous residues.

This is a particular concern when different types of infused liquid, such as different blends of tea, are prepared one after the other. In that case, the proper characteristics of an infused beverage may be altered and undesirably affected by residue characteristics of the previously infused beverage.

U.S. Pat. No. US 4,829,889 discloses a coffee preparation device comprising an infusion tank which can be filled with hot water, and a holder which can communicate with the tank through a communication aperture. A passage communicates with the tank for pouring out the infused coffee. A cartridge is used and contains ground coffee. The cartridge has a removable top seal.

In use, the coffee cartridge is inserted in the holder. The cartridge top seal is automatically removed when the holder is inserted in the device. The opened cartridge in the holder is moved under the tank and the infusion takes place. Once the cartridge has been removed, a cleaning step can take place in which the tank and the holder are cleaned.

The residue removed in this cleaning is discharged, together with the cleaning water, through an exhaust port. Since in the process disclosed there the ground coffee should not leave the coffee cartridge, the volume of the residue usually is not significant and this does not cause a problem. If in this process and device the infusible matter was left to float in the tank for achieving a more homogeneous infusion, the larger residue would clog the exhaust port.

International Patent Application Publication WO 95/01293 A1 discloses a filter pack containing tea leaves for preparing a tea infused beverage. This filter pack comprises a side wall and an expansible brew chamber between a liquid-permeable filter at the bottom of the cartridge and a flexible, liquid-permeable sheet fixed to the inside of said side wall. When water is circulated through the filter pack, the tea leaves swell and the brew chamber expands up to five times the volume of the dry tea leaves to accommodate their expansion.

This filter pack is meant to be used in a conventional coffee percolator comprising a filter receptacle in which the filter pack is to be placed. The dimensions of the filter pack are therefore in function of those of the filter receptacle, and thus not directly linked to the volume of the brew chamber. Here too, the infusible matter remains at all times in the filter pack, obviating the cleaning and residue disposal problems.

SUMMARY OF THE INVENTION

It is an object of the invention to provide a device and process according to which successive infusions, whether of the same type or of distinct types of infusible matter, may be carried out without substantially altering the quality of an infused beverage by residue from previous infusions.

To this end, the device according to the invention includes cleaning means for introducing a liquid and/or vapour within the infusion chamber, removing means for removing the cartridge from the cavity and operating means for operating the cleaning means and the removing means successively.

In use, a cartridge containing infusible matter is introduced in a cavity defined in a receptacle of the device. The bottom part of the cartridge comprises a liquid-permeable filter. An infusion container for containing liquid provided with an opening and the receptacle are arranged in relation to each other in a position wherein the infusion container and the cavity communicate with each other through the opening. Liquid is poured into the infusion container and flows to the cavity so that the infusible matter can be immersed in the liquid. The infusion takes place. Once the infusion finished, a passage in the device communicating with the cavity is opened to let the infused liquid flowing from the infusion container through the cavity and through the filter of the cartridge to the passage.

Directly after the infused liquid has been poured out either in a temporary storage container or in a cup directly, the infusion container may still contain large residue such as tea leaves settling on the inner walls of the container. A cleaning operation is carried out by introducing a liquid and/or vapour within the container.

The vapour condenses on contact with the inner walls of the container while the liquid flows toward the passage through the cavity and the filter of the cartridge. Any large residues settled on the inner walls of the container are dragged away and gathered in the cartridge with the infusible matter already settled in the cartridge. Such a process allows removing from the container residues settling on its inner walls and which would have altered any subsequent infused beverage. These residues are collected in the cartridge; they are removed from the cavity together with the cartridge.

Preferably, the liquid and/or vapour when introduced in the container are directed towards its inner walls. The liquid flows along the walls to wash away the particles.

Preferably, the cleaning means injects the liquid and/or vapour towards the inner walls of the infusion container at a high pressure and temperature to provide a fast and efficient cleaning of the inner walls of the container.

The operating means stops the cleaning means from introducing liquid and/vapour in the container. Once the infusion container is emptied, it operates the removing means in order to remove the cartridge from the cavity automatically. The delay between operating the cleaning means and the removing of the cartridge depends on the volume of the container and the quantity of liquid and/or vapour injected within the container by the cleaning means.

It is a further object of the invention to provide a device and process according to which substantially all parts of the device are cleaned from infused beverages.

To this end, the operating means is adapted to successively operate the cleaning means, the removing means and the cleaning means anew.

Once the cartridge is withdrawn from the cavity, the cleaning means is operated again; liquid and/or vapour is injected in the infusion chamber. The liquid flows from the infusion container through the emptied cavity to the passage. Such operation allows cleaning and rinsing substantially all parts of the device, which were in contact with the infused beverage. This prevents a subsequent infused beverage from being mixed with any liquid residues from the previous one.

The second cleaning operation also allows for the removal of any small residues, which would not have been washed away from the container by the first cleaning process or which are located somewhere in any of the parts of the device in contact with the infused beverage (in the cavity for instance). It is important to wash away such small residues as well, since they too could infuse again in the subsequent infused beverage.

These three successive operations have been found to successfully remove any residues from the container, preferably when applied rapidly afterwards. The device allows for successive preparations of infused beverages of the same type or of different types, while avoiding alterations of the quality of the beverages by liquids or solid residues from previous infusions. The three successive operations also successfully prevent for the inner walls of the container to be stained.

Advantageously, the cavity may be located under the infusion container. Such a position provides for a better collection of infusible matter within the cartridge.

Advantageously, the liquid container may be removable. It gives the option to manually clean the container with any cleaning product.

According to one embodiment of the invention, the device comprises a first waste container for collecting waste liquid from the cleaning means and a second waste container for receiving the used cartridge with residues removed from the cavity. Preferably the first and the second waste containers are separated to prevent the infusible matter in the cartridges from stagnating in liquid, which may cause an unpleasant smell.

It is a further object of the invention to provide a device and process which allows for an optimum and effective infusion of the liquid.

Accordingly, the device includes an introducing means for introducing gas in the infusion container through the cavity.

It is known to the skilled person that tea infusion takes place in three stages. Firstly the caffeine contained in tea leaves is diffused to the liquid, then all aromas give the infusion its flavour and finally the tea leaves release their tannins. If the tea leaves are infused too long or at a wrong temperature, the effect of either the first or the second stage are annihilated, the tannins destroying either the caffeine or the aromas.

The infusion takes place around the tea leaves and water located immediately around the leaves becomes rapidly saturated. The infusion process slows down and the three stages of the process are partially or not properly performed. Water around the leaves is highly concentrated in caffeine and poorly concentrated in aromas.

To prevent such an effect, gas like air is injected within the infusion chamber, while the infusion takes place to stir the liquid and homogenize the infusion.

Introducing gas with oxygen provides the further advantage of improving the quality of infused tea beverages. It is known that water when heated up loses oxygen, which has an effect on the taste of the tea. Oxygenating the liquid while it infuses restores a normal oxygen concentration to water and ensures a high quality taste for the infused tea.

In a preferred embodiment, the step of introducing gas takes place at 50 to 80 percent, or more particularly at 60 to 70 percent, of the time between the end of the step of introducing the liquid to be infused in the container and the beginning of the step of opening the passage.

It is a further object of the invention to provide a device and process, which prevent the infusible matters from remaining within the cartridge during infusion.

In use, once the liquid for infusion is introduced in the infusion container, tea leaves contained in the cartridge located in the cavity are able to move and float freely into the infusion container. However, leaves tend to remain within the cartridge preventing the liquid from infusing properly.

To this end, the means for introducing gas comprises a protruding nozzle arranged in the cavity. The protruding nozzle is provided with at least one opening for introducing gas.

The gas is injected through at least an opening of the cartridge located in the cavity. The gas pushes most tea leaves out of the cartridge so they can float within the infusion container.

Advantageously, the further step of introducing gas takes place substantially immediately after the step of introducing the liquid for infusion. Most tea leaves are carried away from the cartridge into the container as soon as the infusion starts.

In one embodiment, the protruding nozzle is provided with at least one opening in the lateral side of the nozzle, for delivering gas in the cavity and the cartridge contained therein, in a lateral direction, i.e. in a direction which is substantially parallel to a bottom part of the cartridge. A gas emitted in such direction ensures that all infusible matter still settled in the cartridge are dragged away.

In another embodiment, the protruding nozzle is provided with at least one opening on the top of the nozzle, for delivering gas in the receptacle and the cartridge contained therein, in a vertical direction, in a direction which is substantially parallel to a side wall of the cartridge. The protruding nozzle may also contain injecting openings both in its lateral and top sides.

In one embodiment, the container consists of an enclosed container. The enclosed container may comprise a safety valve to prevent any danger from high pressure developing within the container. The size of the infusion container is calculated to contain enough liquid to infuse the infusible matter of a cartridge and to contain gas and air above the surface of the liquid infusing. It is important that heat flows between the infusing liquid and the gas above takes place as it allows for the condensation of aromas, which would have been lost through evaporation otherwise.

It is a further object of the invention to provide a device and process, which creates an optimum infusion according to the type of infusible matter to be infused. It is known to connoisseurs that every sort of tea leaf should be infused according to specific conditions.

To this end, the device includes automatic reading means for reading preparation parameters from the cartridge. The automatic reading means may consist of a barcode reader, a colour detector or a detector of marks engraved on the cartridge.

Advantageously, the preparation parameters may consist of the infusion temperature and/or the infusion duration and/or when the injection of gas takes place, how long it lasts, etc. In one embodiment, heating means are provided for heating the infusion container in order to maintain the liquid when infusing in the container at a right temperature.

In one embodiment, heating means are provided for heating liquid when poured and/or introduced in the infusion container.

Once the infusion finished, the liquid may directly be pumped off and brought by gravity toward the outside of the device, for instance in a cup, or it may be temporarily stored in a storage container before being later pumped or brought by gravity toward the outside.

Advantageously, the passage comprises a spout to allow infused liquid to flow within a cup from the passage directly.

It is another object of the invention to provide a cartridge containing dry infusible matter large enough to accommodate all the infusible matter when it settles back into the cartridge swollen after the infusion. To this end, the top part, bottom part and at least one side wall of the cartridge may enclose a volume between two and five times, particularly around four times, the volume of the dry infusible matter.

SHORT DESCRIPTION OF THE DRAWINGS

These and further aspects of the invention will be explained in greater detail by way of example only and with reference to the accompanying drawings in which.

Figure 7B:
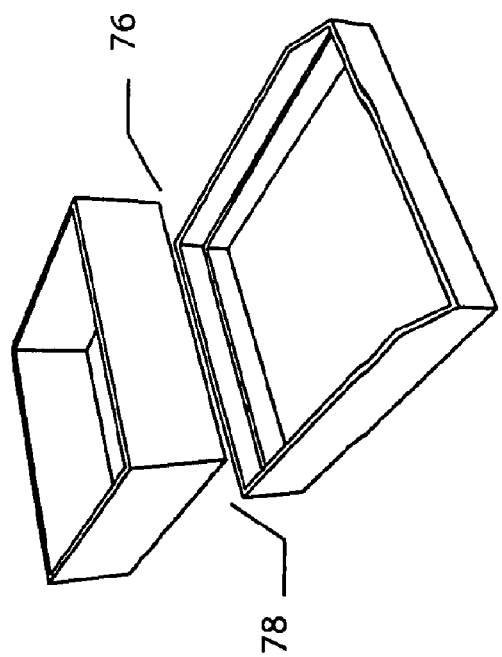
Figure 7A:
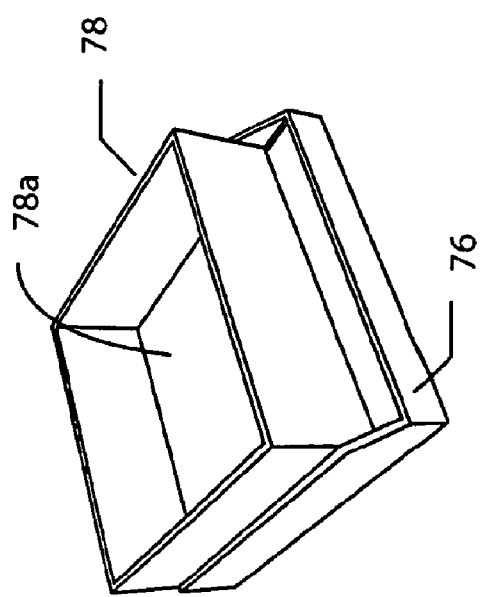
Figure 8F:
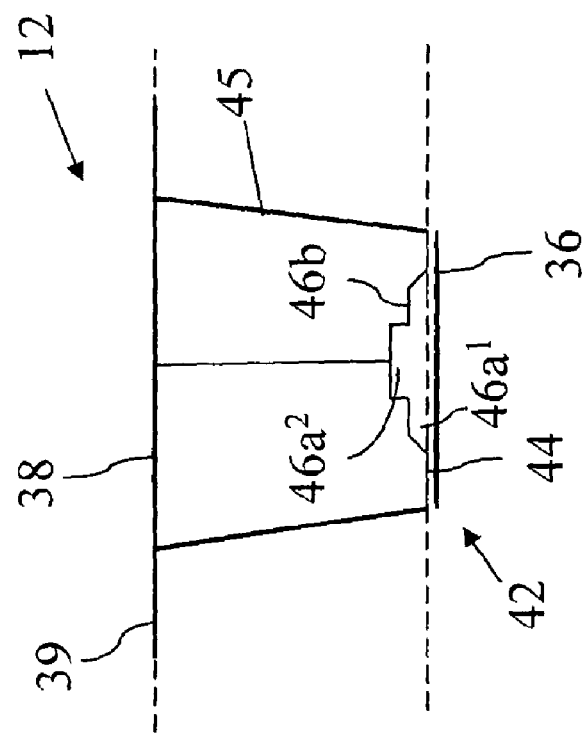
Figure 8E:
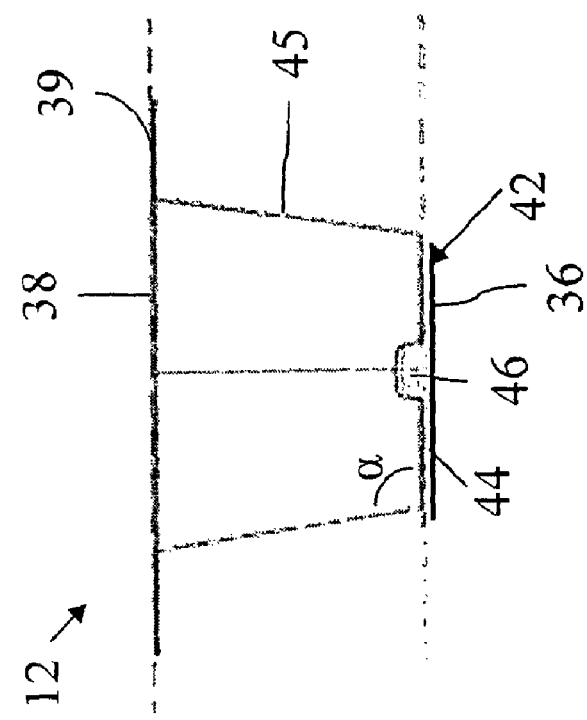
Figure 9:
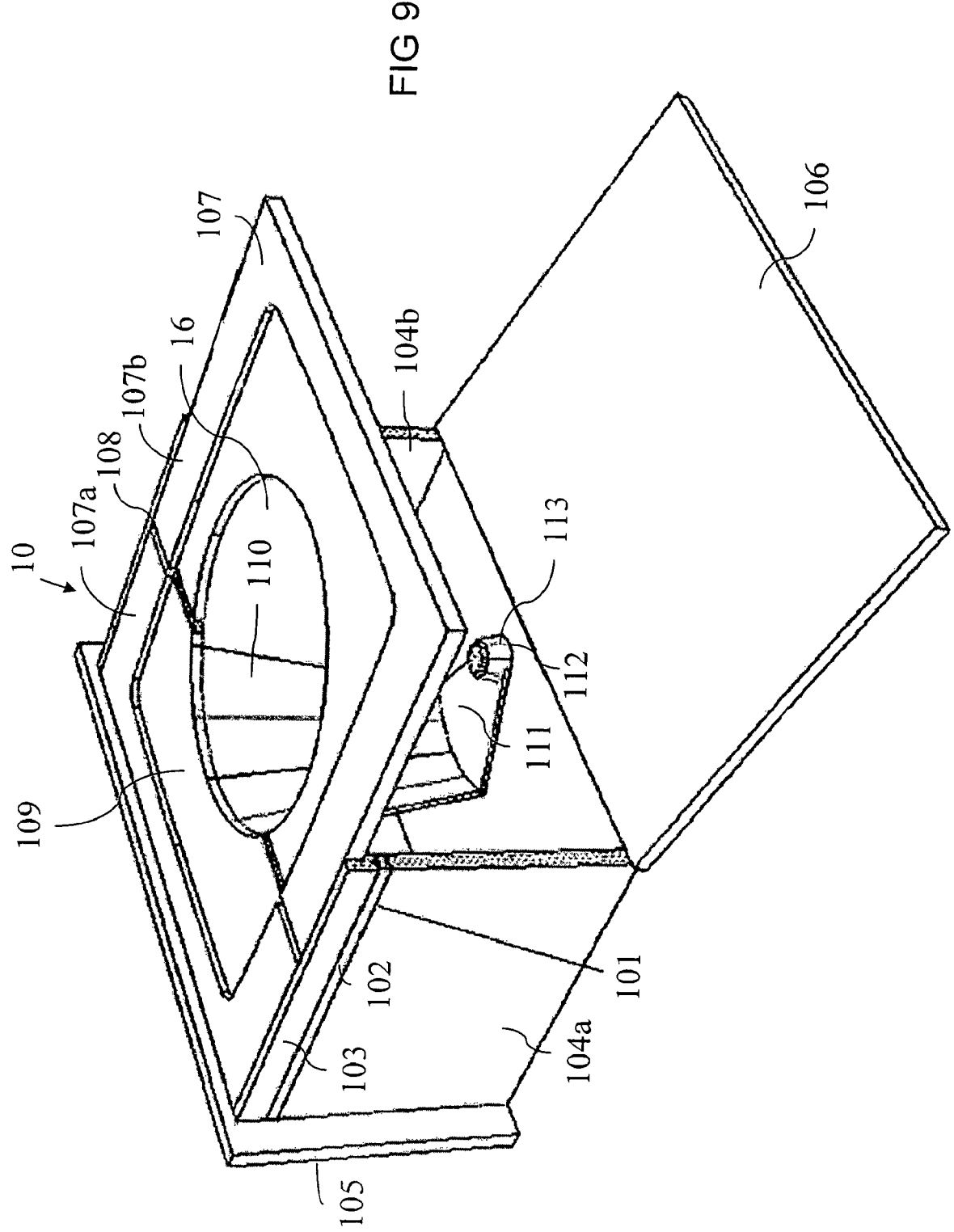
Figure 12A:
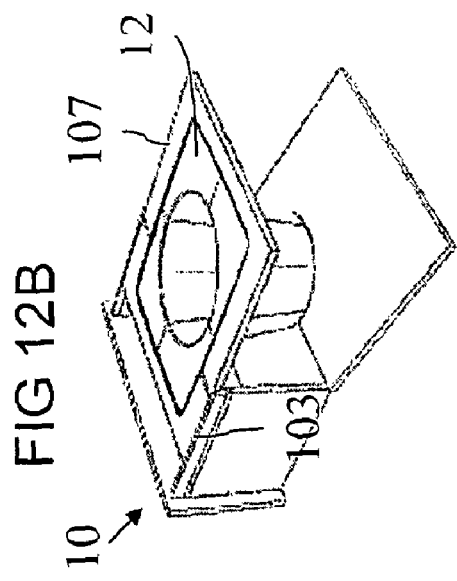
Figure 12B:
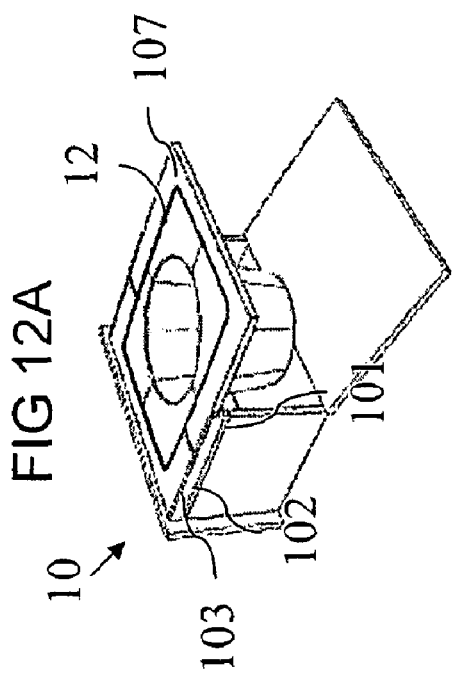
Figure 12C:
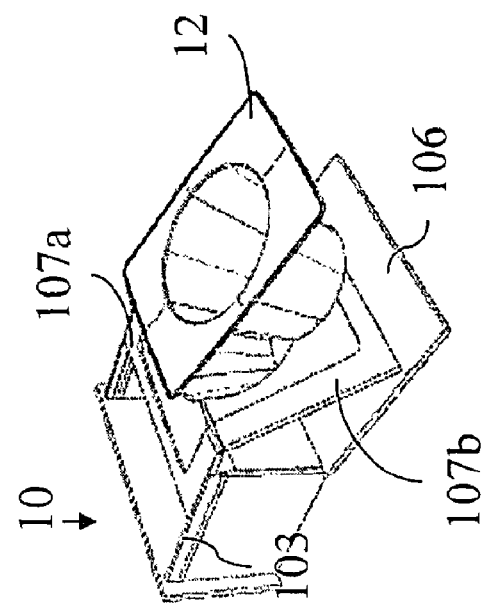
Figure 13:
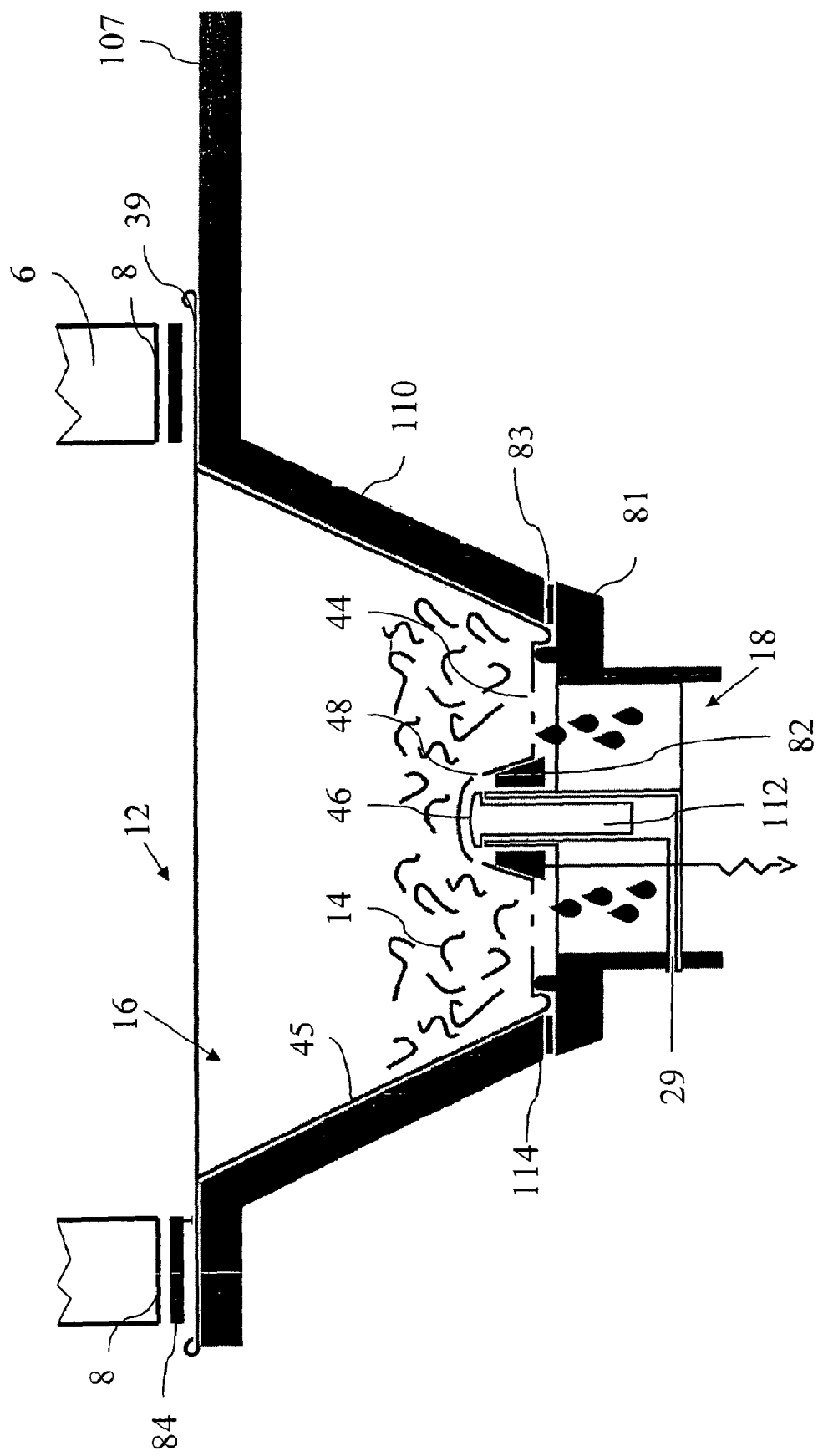

FIG. 7a-b shows a perspective side view of the waste containers according to one embodiment;

FIG. 8a shows a perspective top view of a cartridge according to one embodiment for use in a device for preparing infused beverages;

FIG. 8b shows a perspective bottom view of a cartridge according to one embodiment;

FIG. 8c shows a perspective side view of a cartridge according to one embodiment;

FIG. 8d shows a perspective side view of the bottom part of a cartridge according to one embodiment;

FIG. 8e shows a cross-sectional side view of the cartridge according to one embodiment;

FIG. 8f shows a cross-sectional side view of the cartridge according to another embodiment;

FIG. 9 shows a perspective top view of a receptacle for receiving cartridge according to one embodiment;

FIG. 10a-c shows a mechanism for the opening of the receptacle according to one embodiment;

FIG. 11a-e shows a mechanism for opening a cartridge located inside the device for preparing infused beverages according to one embodiment;

FIG. 12a-c shows a mechanism for ejecting a cartridge once used according to one embodiment;

FIG. 13 shows a schematic section of a receptacle for receiving a cartridge according to another embodiment;

The figures are not drawn to scale. Generally, identical components are denoted by the same reference numerals in the figures.

DETAILED DESCRIPTION OF PREFERRED EMBODIMENTS

Figure 1:
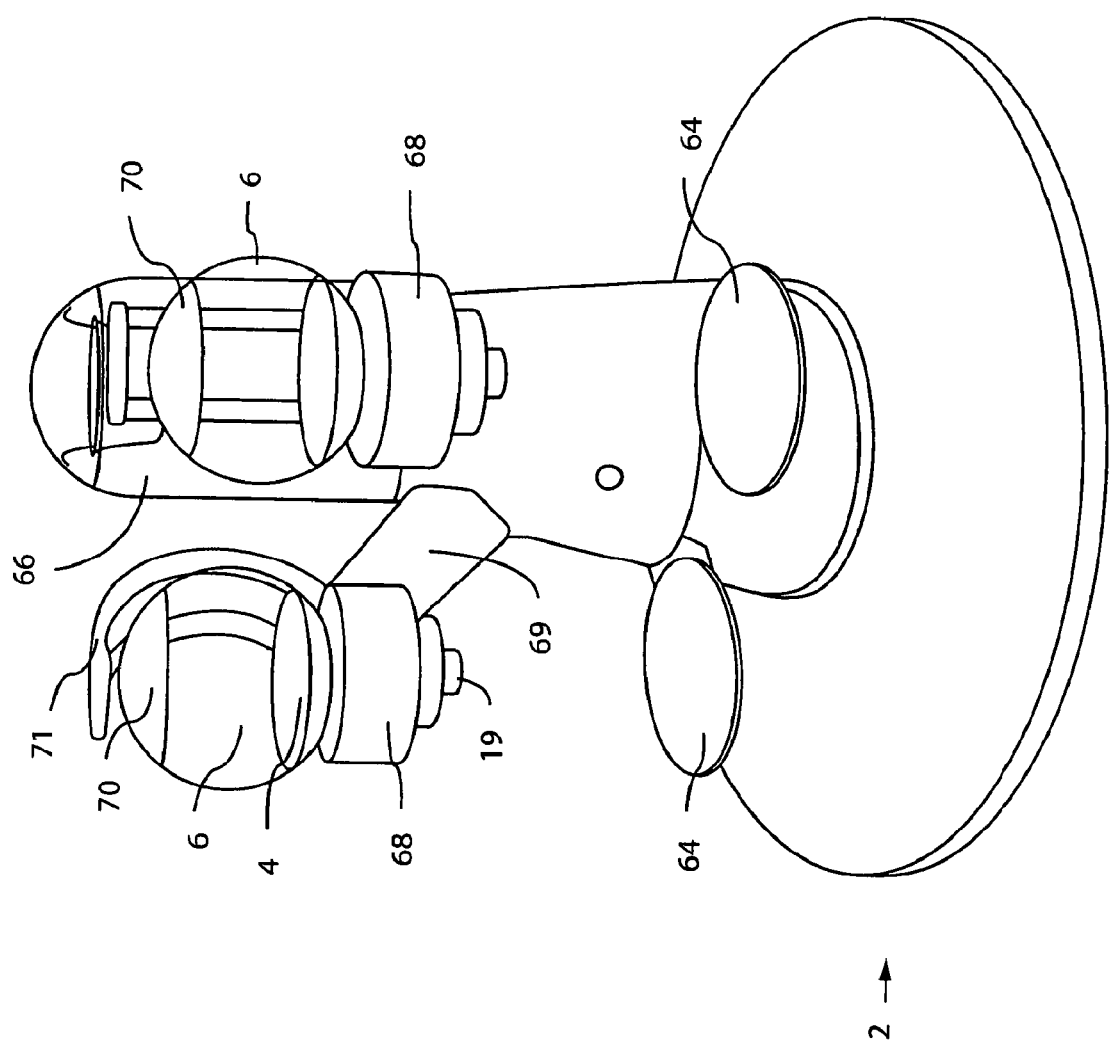
FIG. 1 shows a perspective front view of the device for preparing infused beverages according to one embodiment.

FIG. 1 shows a perspective front view of the device for preparing infused beverages according to one embodiment.

The device 2 comprises a removal reservoir 66 containing liquid. The reservoir 66 preferably contains filtered water for preparing infused beverages. The reservoir 66 preferably consists of a bottle closed with a valve-cap.

The reservoir 66 may consist of any standard bottle (mineral bottle or the like) on to which the valve-cap has been screwed. The device 2 further comprises two infusion containers 6 for containing liquid 4. The infusion container 6 is designed to simultaneously contain air and enough water for a normal cup of beverage. Alternatively, the infusion container 6 is designed to contain several cups of beverage. The container 6 preferably consists of an enclosed space. The infusion container 6 may be provided with a security valve (not represented) to allow air and water to escape to prevent any danger from high pressure occurring.

The infusion container 6 is preferably removable to allow for its cleaning and its replacement if necessary. It is made of glass, metal, cast iron, stainless steel or any other heat resistant material adapted to contain infused liquid.

The infusion container 6 is disposed on a platform 68 connected to the device 2 via a supporting arm 69. A removable holding cap 70 is clipped on top of the container 6. An opening (not represented) is located on top of the container 6 and is closed by the holding cap 70. A pair of arc-shaped arms 71 connects the holding cap 70 to the platform 68. The container 6 is securely held between the platform 68 and the holding cap 70. The supporting arm 69, the holding cap 70, the pair of arms 71 enclose various conduits for gas and liquid to flow between the infusion container 6 and other internal elements of the device 2.

An opening 8 (not represented) is provided at the bottom of the container 6 to allow liquid 4 to flow out of the container 6.

The platform 68 comprises a spout 19, through which the infused beverage is poured out of the device 2. The spout opens above a cup support 64. The cup support 64 is adapted to hold a cup or any similar container to collect the infused beverage poured from the spout 19 directly.

The device 2 may be adapted to prepare simultaneously one, two or more infused beverages at a time. The device 2 comprises a corresponding number of infusion containers 6 and accompanying parts.

Figure 2:
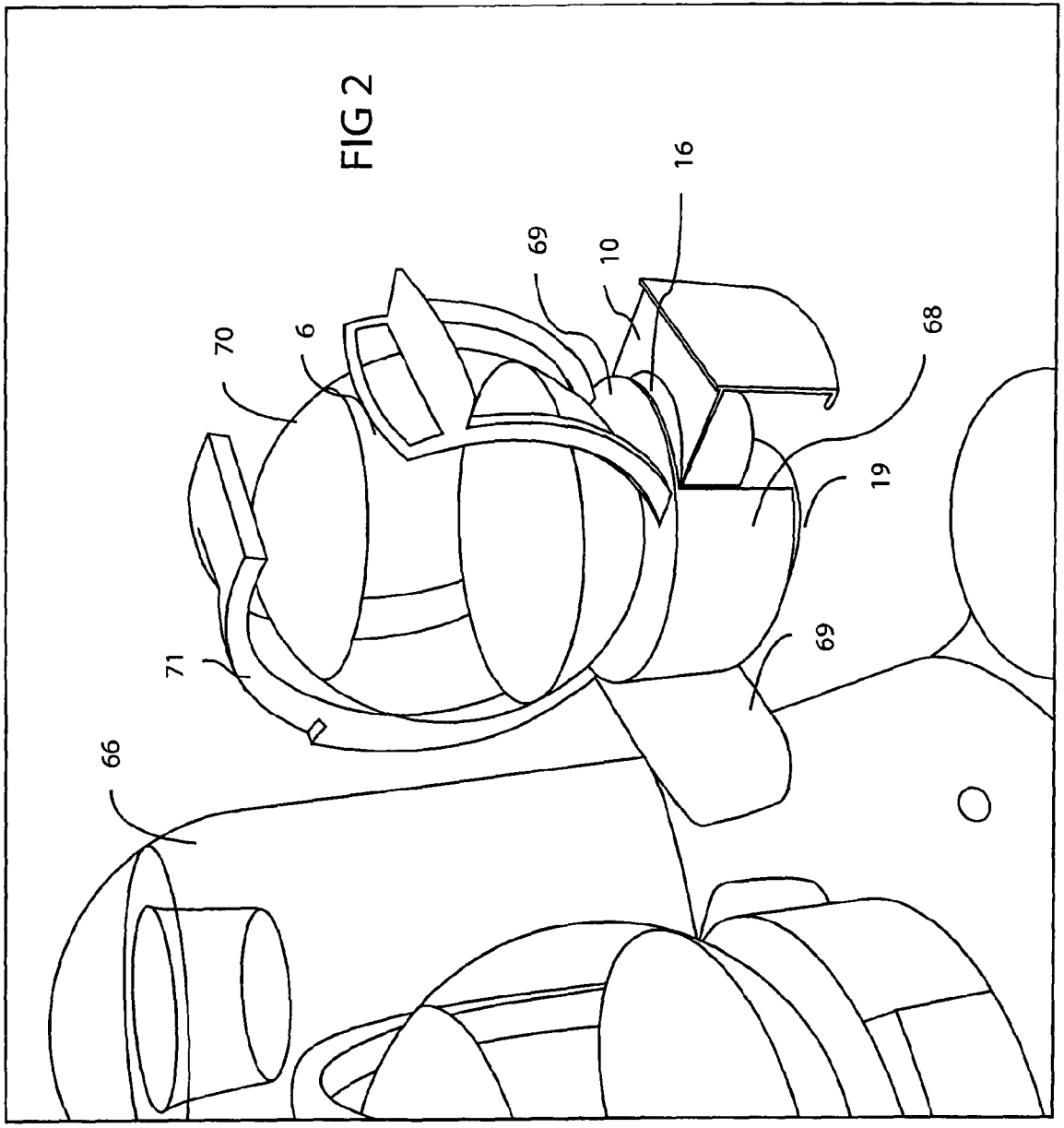
FIG. 2 shows a detailed perspective side view of the device.
Figure 3:
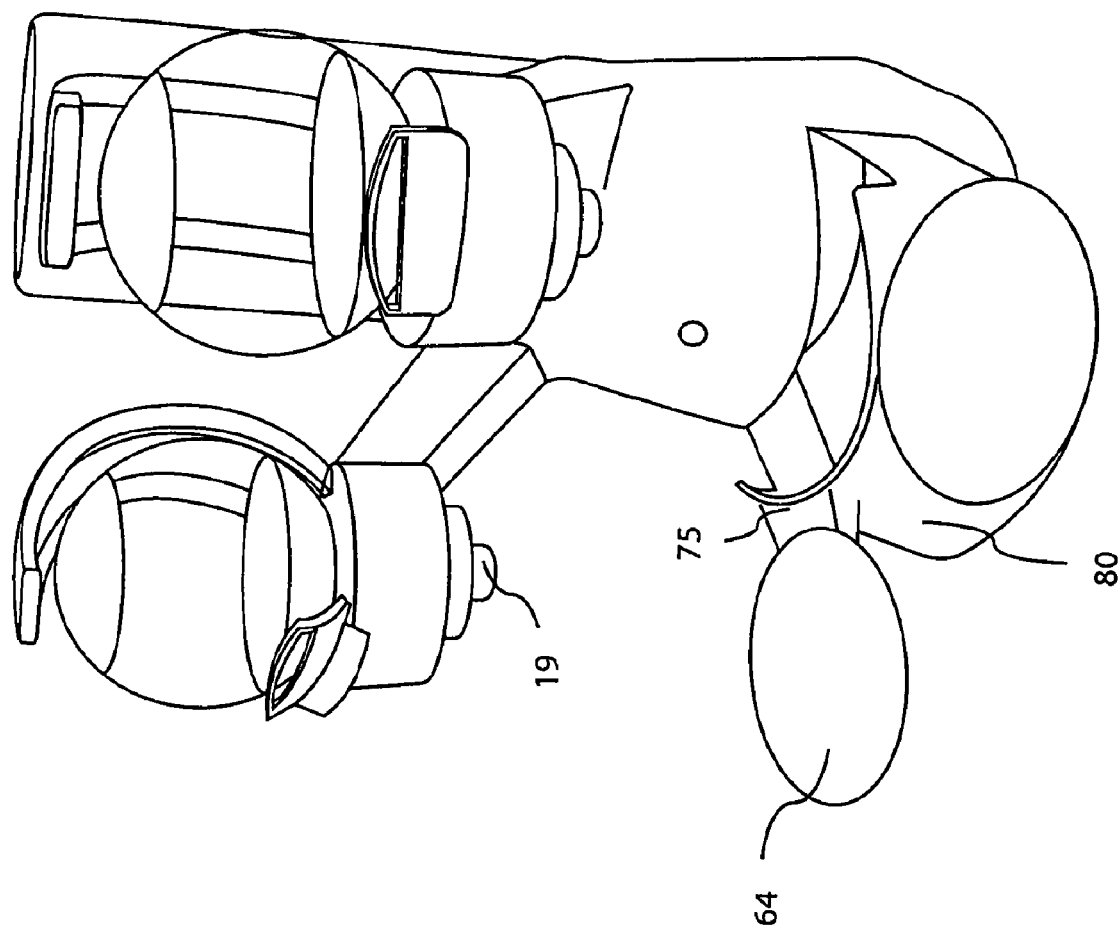
FIG. 3 shows a perspective front view of the inside of device for preparing infused beverages according to one embodiment.

Referring now to FIG. 2, the platform 68 comprises a receptacle 10 for receiving a cartridge 12 containing infusible matter 14.

In this particular embodiment, the receptacle 10 consists of a drawer. The drawer 10 is operable between at least a first position and a second position. The drawer 10 slides from a closed position in the platform 68 to an opened position out of the platform 68. The drawer comprises a cavity 16 into which a cartridge 12 (not represented) containing infusible matter may be inserted. The drawer 10 may slide either automatically or manually. When the drawer 10 is closed in the platform 68, the cavity 16 of the drawer 10 communicates with the bottom opening 8 of the infusion container 6, so that the infusion container 6 and the cavity 16 form an infusion chamber.

In another embodiment, the receptacle 10 may consist of a pivoting drawer, pivoting towards and away from the platform 68. Alternatively, the receptacle 10 may be fixed with respect of the device 2, while the infusion reservoir 6 is operated in order to be positioned in contact to the receptacle 10.

The cavity 16 of the drawer 10 is connected to a passage 18 (not represented) located in the platform 68. An actuated valve allows closing and opening the passage 18. When the passage 18 is opened, liquid flows out of the infusion container 6 through the cavity 16 to the passage 18. When the passage 18 is closed, the infusion chamber formed by the cavity 16 and the infusion container 6 is closed. The passage 18 is connected to the spout 19 as well as to a conduit for waste water described below through actuated valves. Liquid flowing into the passage may be directed either to the conduit for waste water or to the spout 19.

The device 2 may further comprise a temporary storage container, connected to the passage 18 through actuated valves, to temporally store the infused beverage. However it is recommended to transfer the infused beverage to the cup directly, ready to be used, since the infused beverage continues infusing in the storage container, impairing its taste and flavour.

Figure 4:
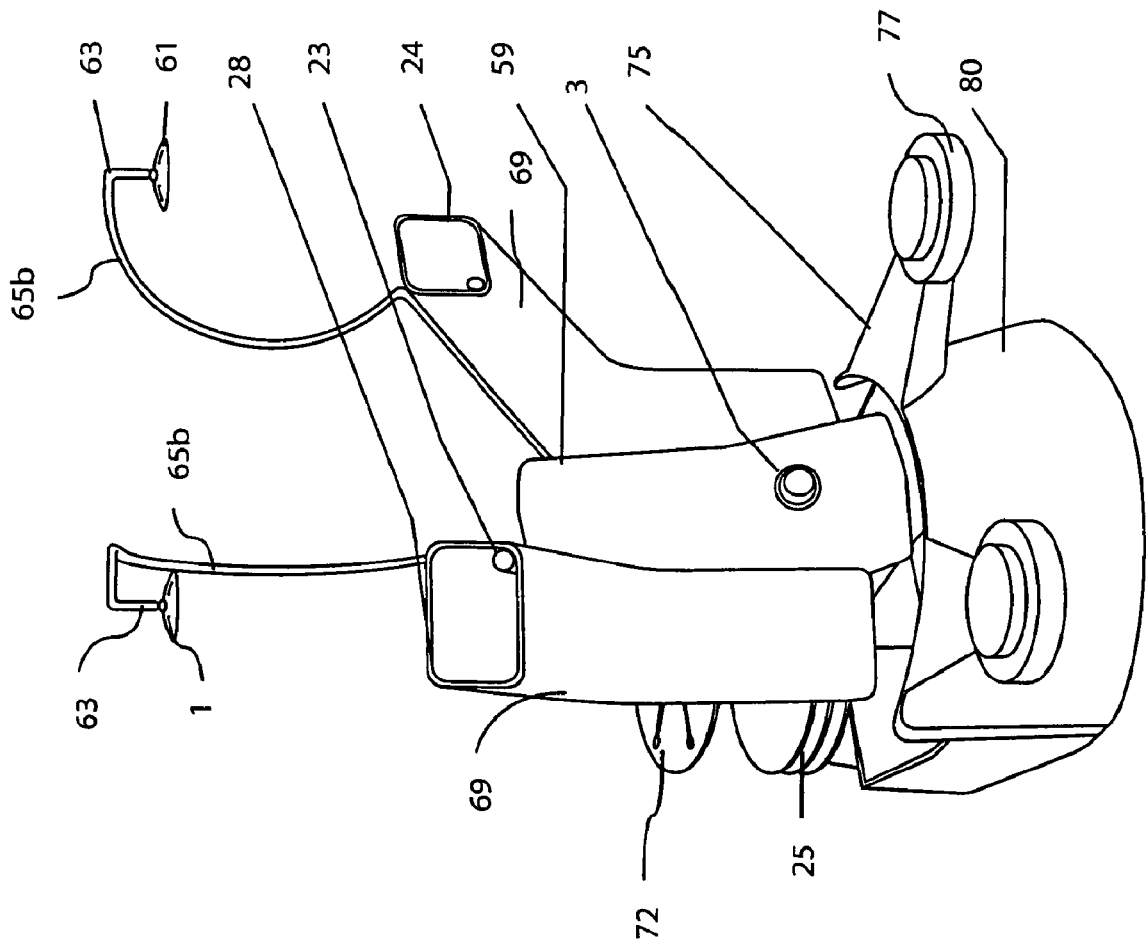
FIG. 4 shows a perspective front view of the inside of device for preparing infused beverages according to one embodiment.
Figure 5:
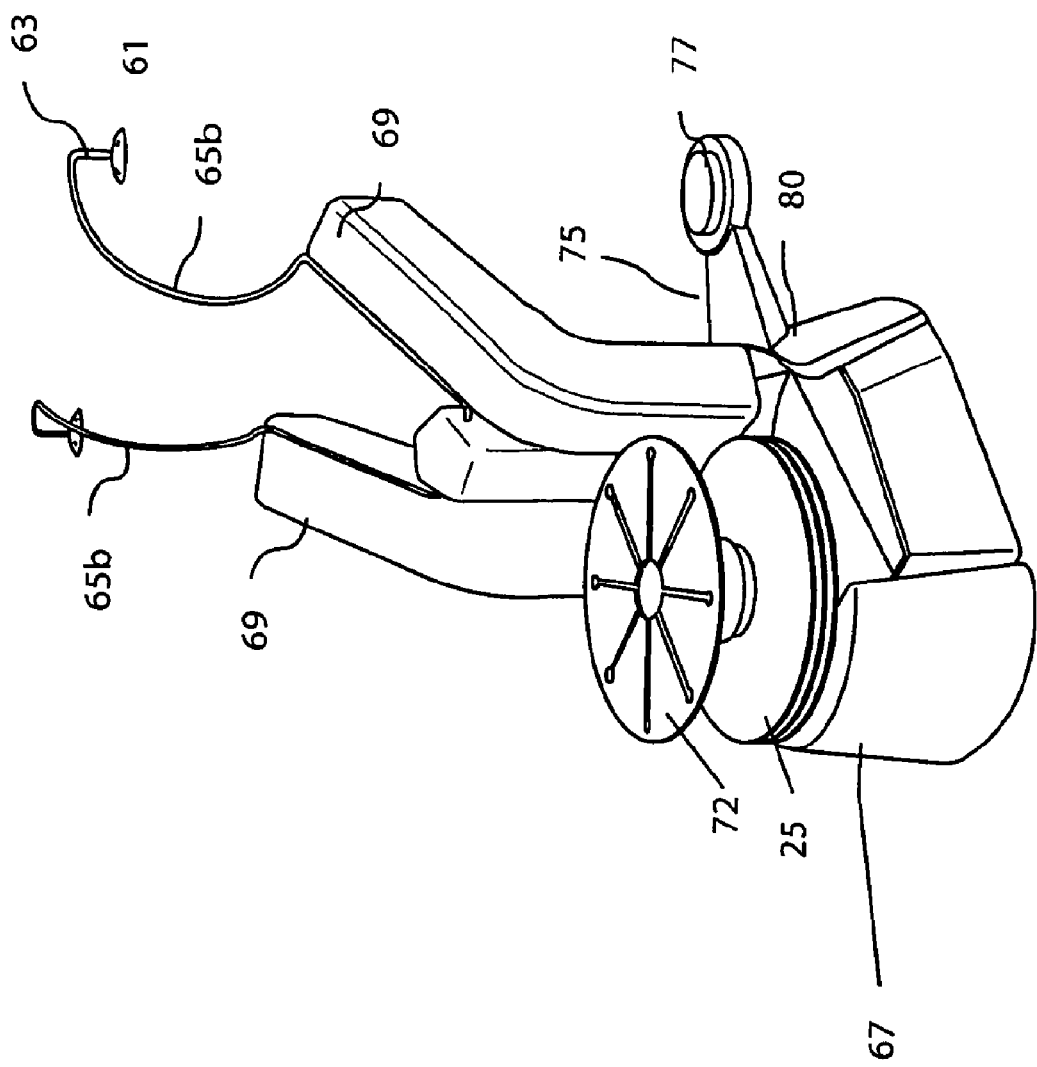
FIG. 5 shows a perspective back view of the inside of device for preparing infused beverages according to one embodiment.
Figure 6:
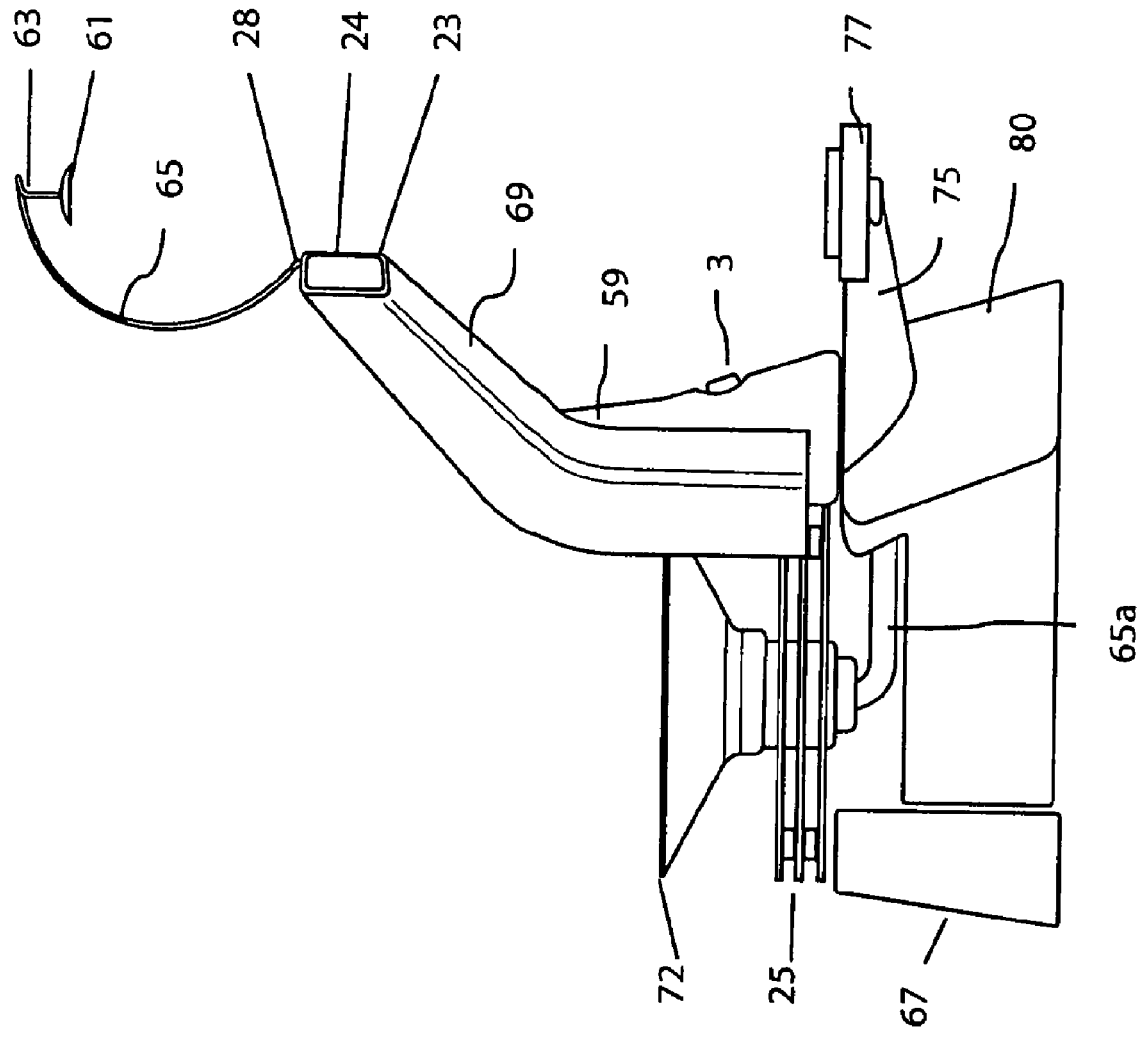
FIG. 6 shows a perspective side view of the inside of device for preparing infused beverages according to one embodiment.

The device 2 is now described in respect with FIGS. 4, 5, 6.

The device 2 comprises a support 72 for the reservoir 66. The support 72 comprises an opening where the valve-cap of the reservoir 66 is plugged, giving access to the water contained in the reservoir 66. The support 72 is connected to a conduit 65a, creating a flow path for water from the reservoir 66. The conduit 65a is connected to a series of conduits 65b, via a system of actuated valves, to transfer water to respective infusion containers 6. The conduit 65b is located within one of the pair of arms 71. A sprinkler 63 with several outlets 61 is disposed at one extremity of the conduit 65b. The sprinkler 63 is located within the holding cap 70 and is plugged into an opening located at the top of the infusion container 6.

The multiple outlets 61 insure that water is ejected within the container 6 in several directions. A pump 67 is used for the transfer of water from the conduit 65a to the conduits 65b. Water may be ejected in the infusion container 6 at various pressures.

The device 2 further comprises a heating chamber 59 to heat water while travelling within the conduit 65b. Water reaches the recommended temperature when poured within the infusion container 6. The infusion container 6 may also be heated, with the help of a heating element (not represented), to maintain the right temperature of the liquid 4 within the container 6. Such heating element may be located in the platform 68.

In another embodiment, the device comprises a storage container to store water from the reservoir 66. Water in the storage reservoir is heated at a temperature just below boiling, preferably around 95 degree. Hot water from the storage reservoir and cold water from the reservoir 66 are mixed up before being sent to the conduit 65b. A sensor is provided to control the temperature of the water once mixed; the ratio hot water/cold water is adapted so that water is poured within the infusion container 6 at the recommended temperature.

The device further comprises an air or gas inlet pipe 28 located within the arm 69 and the platform 68. The gas inlet pipe 28 is adapted to deliver pressurised gas. In one embodiment, the pump 67 is used for ejecting pressurised gas into one of the inlet pipe extremity. The pump 67 is actuated to control the pressure of the gas at the inlet.

The device 2 further comprises a conduit 23 to collect waste water from the infusion container 6. The conduit 23, connected at one extremity to a first waste container 76 (not represented), travels within the arm 69 and the platform 68, its other extremity being located within the platform 68.

The device 2 further comprises a conduit 24 to collect used cartridges from the receptacle 10. The conduit 24 is located in the arm 69 and opens above a second waste container 78 (not represented) located within the device 2.

In a manner known, the device 2 further comprises a sensor to detect the presence of a cup on one of the cup holder 64, a set of control knobs 3 for the user to operate the device 2, an operating means comprising a processing means to electronically control and operate all mechanisms of the device 2. The processing means includes a printed circuit and memory to store data for use by the processing means.

A system for collecting waste water and used cartridges is now explained in respect with FIGS. 3, 6, 7a, 7b.

The device 2 comprises a sliding drawer 80. A first removable waste container 76 is located within the drawer 80; a second removable waste container 78 is located within the drawer 80 on top of the first waste container 76. The second waste container 78 is adapted to collect used cartridges 12. Its bottom section 78a comprises a filter or perforations to let liquid flowing out. The first waste container 76 is adapted to receive waste water.

A connecting arm 75 connects the cup holder 64 to the drawer 80. The cup holder 64 comprises a waste container 77 to collect liquid flowing either from the spout 19 or from the cup on the cup support 64. The waste container 77 is connected through a conduit (not represented) located in the connecting arm 75 to the drawer 80 so that waste water from the waste container 77 is collected in the first waste container 76.

In this embodiment, the first and second waste container 76 and 78 are separate. Alternatively, the device 2 may contain a single waste container used to both spent cartridges 12 and waste water.

As shown in FIGS. 8a, 8b, 8c, 8d, 8e, the cartridge 12 for use with the present invention generally comprises a bottom part 42 provided with a filter 44 adapted to let liquid pass through, a top part 38 provided with an opening 35 and at least one side wall 45 joining the bottom and top parts 42, 38. It defines an inner volume 40 to contain infusible matter 12. The volume 40 is calculated so to receive enough infusible matter 12 for preparing a standard cup of infused beverages.

Infusible matter when soaked tends to swell. The volume 40 is also calculated to contain all the swollen infusible matter once infused. A preferable volume 40 can be between two and five times, preferably around four times, the volume of the dry infusible matter 14.

The cartridge 12 is conical, truncated at the level of the bottom part 42. In one embodiment, the section of the top and bottom part 38, 42 is circular or oval. The section of the opening 35 is circular or oval. The angle a formed by the side wall 45 and the bottom part 42 is between 90 and 100 degrees and preferably comprised between 93 and 97 degrees. In another embodiment, the cartridge 12 is cylindrical.

Such a shape allows creating an inner volume 40 big enough to contain enough infusible matter for preparing a standard cup of beverage. Such shape allows the cartridge 12 to be steadily inserted within the cavity 16. It is also perfectly suitable to ensure a perfect fit between the cartridge 12 and the cavity 16.

The at least one side wall of the cartridge 12 is air- and waterproof and opaque to be impermeable to water, air and light.

The cartridge 12 is preferably made of aluminium. Food contact approved aluminium may be used. Alternatively, the inner surface of the cartridge 12 may be covered with a food contact approved coating layer able to resist to temperatures at least up to 100° C. during several minutes.

Preferably, the filter 44 is as part of the cartridge 12 and consists of a perforated sheet made of aluminium. Food contact approved aluminium may be used. Alternatively, the inner surface of the filter 44 may be covered with a food contact approved coating layer.

Alternatively, the filter 44 may consist of at least a sheet made of wool or of any natural or synthetic material adapted to infusion and filtering. It is attached in a conventional manner to the bottom part 42, preferably on the inner wall of the cartridge 12.

The top part 38 comprises a lip 39 surrounding the opening 35 at least partly. The lip 39 rests upon the rim of the receptacle 10. The opening 35 is closed and covered by a sheet 50 (not represented) arranged towards the outside of the cartridge. Preferably the sheet 50 is made of aluminium and is heat-sealed to the lip 39 in a conventional manner. Alternatively, it may be made of a transparent material, so as to allow a user to view the contents of the cartridge before use. In that case it would be preferable to have a coating layer of a contrast-enhancing colour on the inner wall of the cartridge 12.

In one embodiment, the top part 38 may be covered by a filter (not represented) arranged towards the outside of the cartridge 12. The sheet 50 covers the filter. The filter consists of an extensible or deformable sheet made of wool or of any natural or synthetic material adapted to infusion and filtering. When a cartridge 12 comprising such filter is immersed in water, the filter spreads in water out of the cartridge; the filter creates a space in water where infusible matter 14 contained in the cartridge 12 is able to float. Such a filter prevents that the infusible matter 14 scatters everywhere in the infusion container 6 in particular and in the device in general. The bottom part 42 is recovered by a removable sheet 36, arranged towards the outside of the cartridge 12 with respect to the filter 44. The removable sheet 36 may be heat-sealed or glued to the cartridge 12 in a conventional manner. It is made of aluminium or of any other food approved material. The removable sheet 36 comprises a prehension means (not shown), so a user can grasp and remove it from the cartridge 12.

The sheets 36 and 50 hermetically close and vacuum-pack the inner contents 40 of the cartridge 12. The infusible matter 14 is protected from air and humidity. Both sheets 36, 50 and cartridge 12 are preferably made of an opaque material to protect its contents 14 for light as well.

The cartridge 12 may comprise marks or any automatic readable means comprising or indicating infusion parameters. The marks or readable means may be located either on the outside surface of the side wall 45 or on the lip 39 or on the sheet 50.

In one embodiment, the bottom part 42 includes a recess 46 arranged toward the inside of the cartridge 12. The recess 46 is frustroconical, the larger section of the recess 46 being at the level of the bottom part 42. The larger section of the recess 46 has a diameter comprised between 2 and 15 millimeters, or more particularly between 2 and 6 millimeters.

The recess 46 comprises openings 48 for letting gas pass through. In one embodiment, four openings 48 are located on the side wall 52 and one on the top part 54 of the recess 46. As a matter of example, the four openings 48 on the side wall are arranged symmetrically with respect of the axis of the recess 48.

The receptacle 10 according to one embodiment is now explained in respect with FIG. 9.

The receptacle 10 consist of a drawer comprising a front panel 105, a tray 107. The drawer 10 slides along two side panels 104a and 104b located inside the platform 68. The platform 68 further comprises an ejection chute 106 forming a slope going down within the platform 68. One side of the ejection chute 106 is disposed against the bottom part of both side panels 104a, 104b while the other side of the ejection chute 106 is connected to the conduit 24 at the entrance of the arm 69. A multiple runner mechanism is disposed on the top edge of both side panels 104a, 104b.

The tray 107, linked to the side panels through the multiple runner mechanism, slides along the side panels 103, 104. The tray 107 is formed by two panels 107a and 107b hinged to each other through a hinge 108. The hinge 108 is disposed perpendicular to the sliding direction of the tray 107.

In one embodiment, the multiple runner mechanism may consist of a first runner 101 disposed on the top edge of the side panels 104a, 104b, of a second runner 102 sliding on or within the first runner 101, of a third runner 103 sliding within the second runner 102. The tray 107 slides on or within the third runner 103. The front panel 105 is fixed to the third runner 103. The multiple runner mechanism may be activated automatically or manually. The automatic activation is controlled through a conventional actuation mechanism known from the person skilled in the art.

The tray 107 comprises a cavity 16 adapted to receive a cartridge 12. The cavity 16 comprises partial side walls 110 connected to the first panel 107a of the tray 107 and a partial bottom part 111 connected to the side walls 110.

The partial side walls and bottom part 110 and 111 are disposed towards the front panel 105 and underneath the first panel 107a only. The partial side walls 110 and the partial bottom part 111 form a partial cone or cylinder, truncated at the level of the bottom part 111. The dimensions of said partial cone are slightly larger than those of the cartridge 12, so that the cartridge 12 perfectly fit into the cavity 16.

A protruding nozzle 112, preferably cylindrical or frustro-conical, is located on the bottom part 111 towards the inside of the cavity 16. The dimensions of protruding nozzle 112 are such that the recess 46 of a cartridge 12 inserted in the cavity 16 perfectly fits the protruding nozzle 112. The protruding nozzle 112 comprises openings 113 injecting gas towards the inside of the cavity 12. The openings 113 are disposed in the protruding nozzle 112 in such way that the openings in the recess of a cartridge 12 inserted in the cavity face the injection opening 113. In one embodiment, four openings 113 are located on the side wall of the nozzle 112 and one on its top part 54.

The protruding nozzle 112 is connected to a conduit 29 (not represented) located within the bottom part 111 of the cavity 16.

Alternatively, the conduit 29 may be located on the surface of the bottom part 111 either towards the inside of the cavity 16 or the outside of the cavity 16.

The conduit 29 is connected to gas inlet pipe 28.

In another embodiment, the protruding nozzle 112 may be located on the partial side walls 110 of the cavity 16.

A recess 109 is disposed on the top surface of the tray 107 around the top edges of cavity 16. The section of the recess 109 is slightly larger than that of the lip 39 of cartridges 12 so that the lip 39 of a cartridge 12 received in the cavity 16 perfectly slots the recess 109.

In one embodiment, the tray 107 is removably connected to the third runner 103. A mechanism located in the platform 68 is provided to rise up and support the tray 107 away from the third runner 103.

The drawer 10 further comprises a sensor adapted to detect the presence of a cartridge 12 within the cavity and to sense automatic readable means or marks located on the cartridge 12. Such readable means or marks provide information concerning the infusion temperature, the infusion duration adapted to the infusible matter 14 contained in the cartridge 12, the quantity of liquid to pour into the infusion container 6, information concerning the gas injection through the protruding nozzle 112, etc.

As a matter of example, the sensor may consist of a sensor detecting colours. The colour of the cartridge 12 indicates the type of infusible matter 14 the cartridge 12 contains and is associated with infusion parameters. The sensor may consist of a beam emitter (not represented) located on one side panel 103 and a beam receiver (not represented) located on the other side panel 104. Because the cavity 16 comprises partial side walls only, it does not interfere with the beam transmitting between the emitter and the receiver.

A mechanism for opening and closing the drawer 10 according to one embodiment is now explained in respect with FIGS. 10a to 10c.

FIG. 10a shows the drawer 10 closed within the platform 68 in a first position. All three runners 101, 102, 103 are disposed one on or within the others in a compact position.

The tray 107 is locked on or within the third runner 103.

FIG. 10b shows the drawer 10 in an intermediate position, sliding out of the platform 68. The second runner 102 slides out of the first runner 101 while the third runner 103 remains disposed on or within the second runner 102.

FIG. 10c shows the drawer 10 fully opened in a second position. The third runner 103 slides out of the second runner 102, the three runner 101, 102, 103 between disposed in a fully extended position. The cavity 16 is then fully accessible and a cartridge 12 may be inserted therewith in.

The mechanism to close the drawer 10 is identical to the opening mechanism, following the various steps in an inverted order.

A mechanism to automatically open the cartridge, while the drawer 10 slides into the platform 68, is now described with reference to FIGS. 2 and 11a to 11e.

The device 2 comprises a pair of parallel arc-shaped bars 33 between which a flat blade 31 is attached. The blade 31 is fixedly attached tangent to the cylindrical surface formed between the arc-shaped bars 33. The blade 31 is preferably a semi-circular or semi-oval blade, its straight side being connected to the arc-shaped bars 33 through rods 31a. The small and long diameters of the blade 31 are slightly smaller than these of the opening 35 of the cartridge 12.

The arc-shaped bars 33 rotate around the infusion container 6 through the platform 68 and within the pair of arc-shaped arms 71. The sliding movement of the drawer 10 in the platform 68 is linked to the movement of the arc-shaped bars 33. In one embodiment, the rotation of the arc-shaper bars 33 is controlled by the movement of the second runner 102 sliding on or within the first runner 101. The arc-shaped bars 33 and the second runner 102 are linked in a conventional manner.

The arc-shaped bars 33 are positioned tangent to the sliding direction of the receptacle 10. The arc-shaped bars 33 are located tangent to the tray 107 of the drawer 10 and on each side of the top part of cavity 16 of the drawer 10.

FIG. 11 a shows the position of the blade 31 in relation to the cartridge 12, when the drawer 10 starts sliding into the platform 68. The arc-shaped bars 33 rotate and soon the lip 29 of the cartridge 12 is trapped between the arc-shaped bars 33 and the recess 109 of the tray 107. The edge of the blade 31 touches and pierces the first sheet 50 inside the opening 35 of the cartridge 12 close to the opening edge. FIG. 11b to 11d shows the position of the blade 31 in relation to the cartridge 12, while the drawer keeps on sliding into the platform 68.

The arc-shaped bars 33 keep on rotating; the blade 31 follows a circular movement in and out of the cartridge 12 cutting the sheet 50 close to the edge of the opening 35. It is important that the cartridge 12 is remained blocked in the cavity 12 between the arc-shaped bars 33 and the recess 109 of the tray 107, so that the blade 31 may perform a proper and efficient cut of the sheet 50.

Figure 11B:
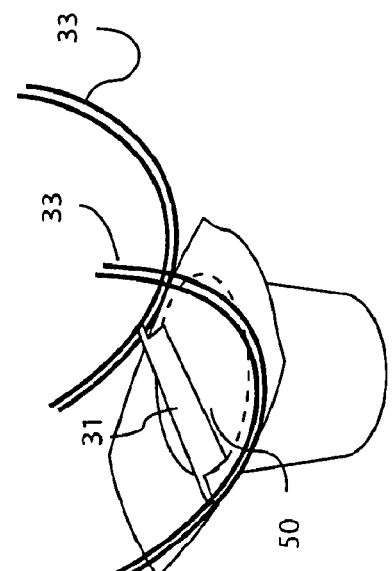
Figure 11A:
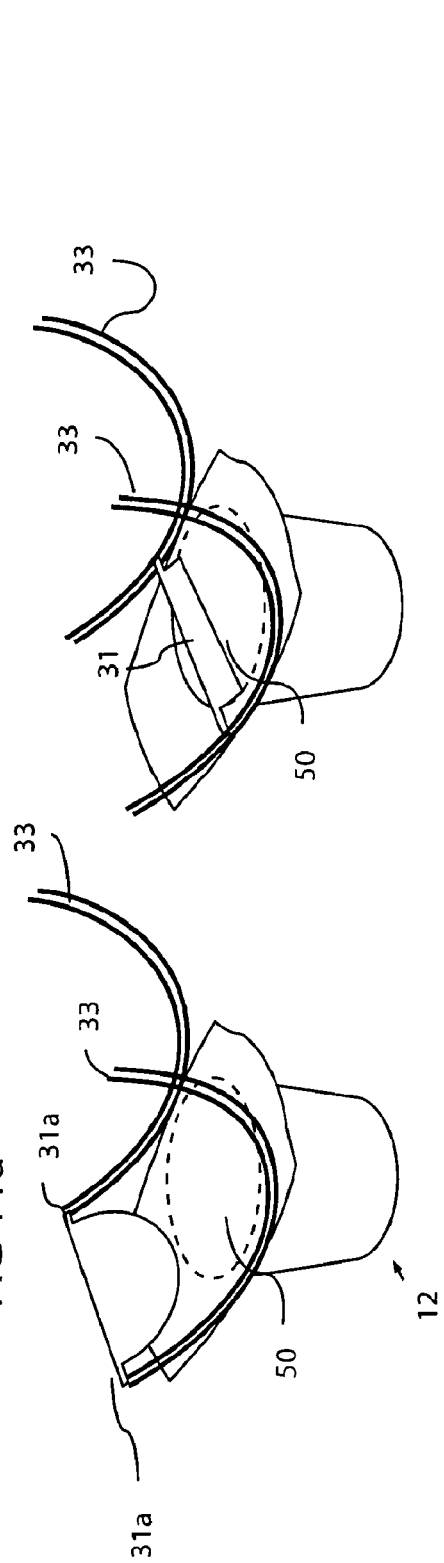
Figure 11E:
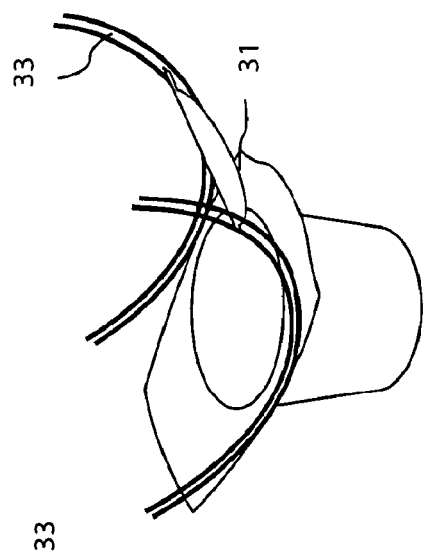
Figure 11D:
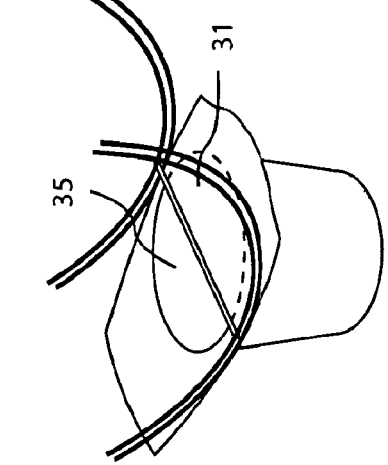
Figure 11C:
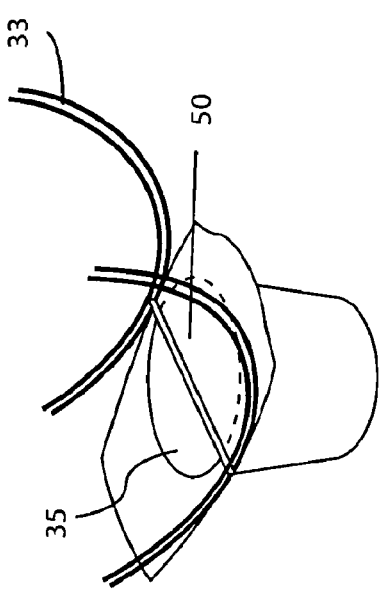

FIG. 11e shows the position of the blade 31 in relation to the cartridge 12, when the drawer 10 reaches its final position in the platform 68. When the blade 31 moves out of the cartridge 12, it pushes away of the cartridge 12 the part of the sheet 31 it just cut out. The cut out part remains partially attached to the sheet 31. The whole opening 35 is accessible.

In another embodiment, the cut out part of the sheet 50 is entirely separated from the sheet 50 and is dragged away by the blade 31, when the blade 31 moves out of the cartridge 12. The cut out part falls by gravity onto the ejection chute 106 and is collected within the second waste container 78.

The blade 31 could be of any shape adapted to the section of the opening 35. The dimensions of the blade need to be smaller than these of the opening 35, to allow the blade 31 to slide in and out of the cartridge 12 via the opening 35 and to cut the sheet 50.

Once the drawer 10 is closed within the platform 68 and once the top sheet 50 of the cartridge 12 has been cut out, the tray 107 is raised up away from the third runner 103.

The lip 39 of the cartridge 12 located in the recess 109 of the tray 107 is brought into contact with the bottom opening 8 of the infusion container 6. A gasket 84 disposed on the edge of the bottom opening 8 ensures a hermetic connection between the infusion container 6 and the lip 39.

The cartridge 12 is firmly maintained blocked within the cavity 16.

The dimensions of the opening 8 of the infusion container 6 are equal or larger than those of the section of the cavity 16 on the tray 107 to surround the opening 35 of the cartridge 12. The dimensions of the opening 8 of the infusion container 6 are smaller than those of the section of the recess 109 of the tray 107.

The device 2 further comprises a movable snapping insert 81 (not represented) located in the platform 68. The movement of the insert 81 is controlled by the operating means of the device 2. The insert 81 is operated to be brought to contact with the cavity 16 of the tray 107. The insert 81 is adapted to fit exactly together with the edge of the side walls 110 of the cavity 16 and with the bottom part 111 of the cavity 16. The insert 81 is also adapted to fit together with the bottom surface of the tray 107. A gasket 83 (not represented) may be disposed on each part of the insert 81 adapted to contact the cavity 16. The insert 81 is connected to the passage 18.

Once the drawer 10 is closed within the platform 68 and once the tray 107 has been brought to contact with the bottom opening 8 of the infusion container 6, the insert 81 is operated and brought to contact with the cavity 16, so the cavity 6 and the insert 81 fit exactly together. The gasket 83 ensures that the surfaces of contact between the insert 81, the cavity 16 and the tray 107 are hermetic. The infusion container 6, the tray 107 the cavity 16 and the insert 81 form a hermetic infusion chamber closed by the passage 18.

A mechanism for ejecting the cartridge 12 from the cavity of the drawer 10 according to one embodiment is now explained in respect with FIGS. 12a to 12c.

FIG. 12a shows the drawer 10 closed within the platform 68 in the first position. All three runners 101, 102, 103 are locked disposed one on or within the others in a compact position. FIG. 12b shows the tray 107 in an intermediate position, sliding on or within the third runner 103, towards the inside of the platform 68. FIG. 12c shows the tray 107 sliding further towards the inside of the platform 68 in a third position, where the tray 107 folds up around the hinge 108. The second panel 107b slides out of the third runner 103 and falls on the ejection chute 106. The cavity 16 comprising partial side walls 110 along the first panel 107a only, the cartridge 12 is not held within the cavity 16 anymore. The cartridge 12 is released from the cavity 16; it falls on the ejection chute 106 and slides down toward the ejection conduit 24 in the arm 69.

While the cartridge 12 falls down on the ejection chute 106, the cut out part of the sheet 50 is pushed back toward the sheet 50 and partially closes the opening 35 of the cartridge 12. The infusible matter 14 is maintained within the cartridge 12.

The ejection mechanism to withdrawn the cartridge 12 allows to eject the cartridge smoothly. It prevents the infused matter 14 contained in the cartridge 12 from falling out of the cartridge 12. Some infused matter 14 may still fall out of the cartridge 12 when it is dropped onto the ejection chute 108. It is collected on the ejection chute 108 in any case.

A drawer 10 and an insert 81 according to another embodiment of the invention are now explained in respect with FIG. 13. A mechanism for detecting a cartridge 12 in the cavity 16 is also presented.

The drawer 10 comprises a tray 107 with a cavity 16 adapted to receive a cartridge 12. The cavity 16 comprises side walls 110 connected to the tray 107. The side walls 110 form a partial cone or cylinder, truncated at the bottom part. When a cartridge 12 is inserted in the cavity 16b, it is maintained in the cavity 16 through its lip resting upon the upper surface of tray 107; the side walls 45 of the cartridge 12 lay upon the side walls 110 of the cavity 16.

The device 2 further comprises a movable insert 81 located in the platform 68. The movement of the insert 81 is controlled by the operating means of the device 2. The insert 81 is operated to be brought to contact with the cavity of the tray 107. The insert 81 adapted to fit exactly together with the edges 114 of the side walls 110 of the cavity 16. A gasket 83 may be disposed either on the insert 81 or on the edges 114 of the side walls 110 to ensure a hermetic contact between the cavity 16 and the insert 81. The insert 81 is connected to the passage 18.

A protruding nozzle 112, preferably cylindrical or frustro-conical, is located in the insert 81 towards the inside of the cavity 16. The protruding nozzle 112, provided with openings 113 for the ejection of gas, is connected to a conduit 29 located within the insert 81; the conduit 29 is connected to the inlet pipe 28.

The insert 81 comprises a detector to detect whether a cartridge 12 is slot in the cavity 16 or not. The detector comprises an actuating push-button 82, located around the protruding nozzle 112 and connected to the circuitry 25 of the device 2. The push-button 82 is able to slide up and down along the protruding nozzle 112. When pushed down, it actuates part of the functioning of the device 2. The push-button 82 is cone-shaped, truncated at the level of its top part. The diameter of the bottom section (at the level of the bottom part 42) of the recess 46 of a cartridge 12 is larger than that of the top section of the push-button 82.

Preferably the angle of the cone of the recess 46 is substantially identical to that of the cone of the pushbutton 82.

Once the drawer 10 is closed within the platform 68 and once the tray 107 has been brought to contact with the bottom opening 8 of the infusion container 6, the insert 81 is operated to be brought to contact with the cavity 16, so the cavity 6 and the insert 81 fit exactly together. The cartridge 12 is firmly maintained in the cavity 16, its lip 39 between grasped between the upper surface of the tray 107 and the edge of the opening 8 of the infusion container 6. While the insert 81 is raised up, the protruding nozzle 112 and the push-button 82 move into the recess 46 of the cartridge 12. The outside side surface of the push-button 82 is brought into contact with the side surface of the recess 46.

The push-button 82 keeps on moving into the recess 46, sliding along the surface of the recess 46 until the pushbutton 82 is blocked between the surface of the recess 46 and the protruding nozzle 112. As the insert 81 keeps on sliding up, the push-button 82 is pressed down by the surface of the recess 46 of the cartridge 12; the push-button creates a new connection in the circuitry 25 for the actuation of a process in the device 2. Once the insert 81 is brought into contact to the edges 114 of the cavity 16, the protruding nozzle 112 is located inside the recess 46 of the cartridge 12, so that the openings 113 of the protruding nozzle 112 face the openings 48 of the recess 46.

Another embodiment of the invention is now explained with respect to FIG. 8F. FIG. 8F shows a section of a cartridge 12 according another embodiment of the invention.

The bottom part 42 of the cartridge comprises a recess 46a towards the inside of the cartridge 12. The recess 46a consists of a first truncated cone 46a1, its larger section being at the level of the bottom part 42 of the cartridge 12 and of a second truncated cone or cylinder 46a2 "stacked" upon the first cone 46a1. The intersection between the first and second cone 46a1 and 46a2 constitutes an actuating surface 46b. The recess 46a2 comprises openings 48 for letting gas pass through.

The diameter of the bottom section of the recess 46a1 is larger than that of the top section of the push-button 82.

Preferably the angle of the cone of the recess 46a1 is substantially identical to that of the cone of the pushbutton 82.

In use, when the insert 81 is raised up, the protruding nozzle 112 and the push-button 82 of the insert 81 move into the recess 46a1 of the cartridge 12. The outside side surface of the push-button 82 is brought into contact with the side surface of the recess 46a1. The push-button 82 slides along the surface of the recess 46a1 until being blocked by the actuating surface 46b. As the insert 81 keeps on sliding up, the push-button 82 is pressed down by the surface 46b; the push-button creates a new connection in the circuitry 25 for the actuation of a process in the device 2. Once the insert 81 is brought into contact to the edges 114 of the cavity 16, the protruding nozzle 112 is located inside the recess 46a2 of the cartridge 12, so that the openings 113 of the protruding nozzle 112 face the openings 48 of the recess 46a.

The functioning of the device for preparing infused beverages is now explained. The receptacle 10 opens manually or automatically through the activation of a knob.

A cartridge 12, to which the removable bottom sheet 36 has been removed, is introduced in the receptacle 10. The receptacle 10 is closed automatically or manually and slides within the platform 68. While the receptacle 10 is closed, the sensor detects the presence of the cartridge within the cavity 12 as well as its colour.

Simultaneously the protective top seal 50 is cut out from the cartridge 12 automatically, giving access to the infusible matter 14 located within the cartridge 12.

The processor selects infusion parameters according to the colour of the cartridge 12 in a conventional manner.

A hermetic connection is created between the infusion container 6, the cavity 16 and the passage 18. The tray 107 is raised up away from the third runner 103. The snapping insert 81 is brought to contact with the cavity 16 and with the tray 107. The passage 18 is closed. The hermetic infusion chamber, closed by the passage 18, is formed with the infusion container 6, the tray 107, the cavity 16 and the snapping insert 81.

Valves are actuated to connect the conduit 65a to the relevant conduit 65b. Water is pumped from the reservoir 66 and sent to the conduit 65b at the recommended pressure selected by the processor according to the colour of the cartridge 12. Water is heated while travelling through the heating chamber 69. The sprinkler 63 pours hot water in the container 6 at the recommended temperature selected by the processor according to the colour of the cartridge 12.

Liquid is introduced in the infusion container 6 immersing the infusible matter 14 contained in the cartridge 12. The infusible matter 14 starts floating freely into the infusion chamber. The infusion takes place.

The processor controls the heating element around the container 6 to maintain the liquid 4 within the infusion container 6 at the recommended temperature.

In the embodiment where the detector comprises a push-button 82 located in the insert 81, the push-button may control the actuation of valves and/or of the introduction of liquid for infusion in the infusion chamber. Such detector prevents the infusion chamber 6 from being filled up with hot water when there is no cartridge 12 in the cavity 16.

Immediately after the infusion container 6 is filled up with water 4, a first oxygenation takes place and pressurised gas is introduced within the container 6 through the opening 113 of the protruding nozzle 112.

Infusible matter 14 is mixed within the infused liquid 4, which is stirred. The gas emitted by the nozzle 113 drags away all infusible matter 14 which may remain in the cartridge 12.

If the pressure at which the gas is injected is too high in comparison to the gas permeability of the filter 44, a gas pocket may form under the surface of the cartridge 12, creating a force pushing the cartridge out of the cavity. Openings 48 provided in the recess 46 prevent the filter 44 from being torn or tensions within the device 2 from developing. The openings 48 are adapted to face the openings 113 of the injection nozzle 112. The size of the openings 48 is substantially equal to that of the injection openings 113.

A second oxygenation takes place later during the infusion; pressurised gas is introduced again in the container 6. Infusible matter 14 is mixed within the infused liquid 4, which is stirred. The gas emitted by the nozzle 113 drag away all infusible matter 14 which may still remain in the cartridge 12.

Data relating to when the second oxygenation takes place, to the duration of the first and the second oxygenations and to the pressure at which the gas is injected within the infusion chamber may be part of the parameters associated with the type of infusible matter 14 contained in the cartridge 12.

Once the infusion finished, valves are actuated automatically; the passage 18 is connected to the spout 19 and is opened. The infused beverage is brought by gravity in the cup located on the cup holder 64. A safety mechanism may be provided to maintain the passage 18 closed if no cup is present on the cup holder 64.

Directly after the infused beverage has been poured into the cup, the cleaning of the device 2 starts. Valves are actuated automatically; the passage 18 is connected to the waste water conduit 23; the conduit 65a to the relevant conduit 65b. The passage 18 remains opened. Water is pumped from the reservoir 66 and sent at a certain pressure to the conduit 65b, so the sprinkler 63 ejects water along the inner walls of the infusion container 6. The sprinkler 63 is provided with enough outlets 61 to eject water in all direction and to ensure that water flows on all inner surfaces of the infusion container 6. Water may be heated while travelling through the heating chamber 69.

The water is preferably ejected in the infusion container 6 as liquid. Cleaning water flows down along the inner walls of the infusion container 6, from the infusion chamber through the waste water conduit 23 towards the first waste container 74. Large residues settled on the inner walls of the container 6 are washed away and collected into the cartridge 12.

When the first cleaning operation is completed and once the infusion container 6 is emptied, the ejection of the cartridge 12 may start. The insert 81 is detached from the cavity 16. The tray 107 is lowered and put to contact with the third runner 103. The ejecting mechanism is actuated to eject the cartridge 12 from the cavity 16. The tray 103 slides back to its previous position and is raised up against the bottom edge 8 of the infusion container 6 again. The insert 81 is brought to contact with the cavity 16 again.

In the embodiment where the detector comprises a push-button 82 located in the insert 81, the push-button 82 is released once the cartridge 12 is removed from the cavity 16. The release of the push-button 82 may control the actuation of valves and/or of the introduction of liquid for infusion in the infusion chamber. For instance, it may control the actuation of the second cleaning operation.

The second cleaning operation starts. Water is injected in the infusion container 6 again to rinse all parts of the device 2 in contact with the infused beverage (i.e. the infusion container 6, the cavity 16, the insert 81, the injection nozzle 112, the passage 18 and the electro-valve controlling the opening of the passage 18).

During the rinsing operation, the passage 18 may be closed and opened several time successively to ensure that all parts of the device 2 in contact with the infused beverage are properly rinsed.

During the rinsing operation, steam may be ejected in the infusion chamber as well as water. The steam quickly fills in the infusion container 6 and reaches the whole inner surface of the infusion chamber before condensing when in contact with surfaces. Steam reaches the difficult-to-access parts of the inner surfaces of the infusion chamber (around the sprinkler 63 in the infusion container 6 for instance).

While various embodiments of the present invention have been described in detail, it is apparent that modifications and adaptations of those embodiments will occur to those skilled in the art. It is to be expressly understood, however, that such modifications and adaptations are within the scope of the present invention.

The invention claimed is:

1. Device (2) for preparing an infused beverage, including:
   a) an infusion container (6) for containing a liquid (4) and comprising an opening (8) to allow the liquid (4) to flow out of the container (6);
   b) a receptacle (10) defining a cavity (16) for receiving a cartridge (12) containing infusible matter (14); wherein the infusion container (6) and the receptacle (10) are operable in relation to each other to be arranged in a position wherein the infusion container (6) and the cavity (16) communicate through the opening (8);
   c) an openable and closable passage (18) communicating with the cavity (16) to allow liquid (4) to flow from the infusion container (6) in the passage (18) through the cavity (16);
   characterized in that it further includes
   d) cleaning means for introducing a liquid and/or vapour within the infusion container (6);
   e) removing means for removing the cartridge (12) from the cavity (16); and
   f) operating means for operating the cleaning means and the removing means successively.

2. Device (2) according to claim 1, wherein the operating means is adapted for operating the cleaning means, the withdrawing means and the cleaning means anew.

3. Device (2) according to claim 1, further including introducing means for introducing gas in the infusion container (6) through the cavity (16).

4. Device (2) according to claim 3, wherein the introducing means comprises a protruding nozzle (112) arranged in the cavity (18) and provided with at least one injection opening (113) for introducing the gas.

5. Device (2) according to claim 4, wherein the device comprises automatic reading means (34) for reading preparation parameters from the cartridge (12), the preparation parameters being selected from the group consisting of the infusion temperature, the infusion duration, when the introduction of gas takes place, how long it lasts and a combination of these parameters.

6. Device (2) according to claim 1, wherein the passage (18) comprises a spout (19) to allow infused liquid (4) to flow within a cup from the passage (18) directly.

7. Device (2) according to claim 1, wherein the device further comprises a first waste container (76) for collecting waste cleaning liquid and/or vapour (22) and a second waste container (78) for receiving the used cartridge (12) removed from the cavity (16).

8. Process for preparing an infused beverage in a device including an infusion container (6) for containing liquid (4) and a receptacle (10) comprising a cavity (16), the infusion container (6) comprising an opening (8) for liquid (4) to flow out, the process including the steps of:
   a) inserting a cartridge (12) containing infusible matter (14) in the cavity (16), the cartridge (12) comprising a filter (44) to let liquid pass through;
   b) arranging the container (6) and the receptacle (10) in relation to each other in a position so that the infusion container (6) and the cavity (16) communicate with each other through the opening (8);
   c) introducing liquid (4) for infusion in the infusion container (6) so that the liquid flows to the cavity (16) immersing infusible matter (14) contained in the cartridge (12);
   d) opening a passage (18) of the device (2), the passage (18) communicating with the cavity (16), to let the infused liquid (4) flow from the infusion container (6) through the cavity (16) and the filter (44) of the cartridge (12) into the passage (18);
   e) characterized in that it further includes the successive steps of introducing a liquid and/or vapour in the container (8) for cleaning the container (6); and
   f) removing the cartridge (12) from the cavity (16).

9. Process according to claim 8, including a further step of introducing a liquid and/or vapour in the container (8).

10. Process according to claim 8, including, between the step of introducing the liquid (4) for infusion and the step of opening the passage (18), a step of introducing gas through the cavity (16) in the infusion container.

11. Process according to claim 10, wherein the step of introducing gas takes place at 50 to 80 percent, or more particularly at 60 to 70 percent, of the time between the end of the step of introducing the liquid (4) for infusion and the beginning of the step of opening the passage (18) and/or substantially immediately after the step of introducing the liquid (4) for infusion.

12. Device (2) for preparing an infused beverage, including:

a) an infusion container (6) for containing a liquid (4) and comprising an opening (8) to allow the liquid (4) to flow out of the container (6);

b) a receptacle (10) defining a cavity (16) for receiving a cartridge (12) containing infusible matter (14); wherein the infusion container (6) and the receptacle (10) are operable in relation to each other to be arranged in a position wherein the infusion container (6) and the cavity (16) communicate through the opening (8);

c) an openable and closable passage (18) communicating with the cavity (16) to allow liquid (4) to flow from the infusion container (6) in the passage (18);

characterized in that it further includes d) cleaning means for introducing a liquid and/or vapour within the infusion container (6);

e) removing means for removing the cartridge (12) from the cavity (16); and f) operating means for operating the cleaning means and the removing means successively.

\* \* \* \* \*